United States Patent
Uhl et al.

(10) Patent No.: US 8,371,767 B2
(45) Date of Patent: Feb. 12, 2013

(54) PULL-PUSH ROD

(75) Inventors: Albert Uhl, Sinzheim-Kartung (DE); Francisco Gomez, Rosengarten (DE); Soeren Koch, Winsen (DE)

(73) Assignees: GMT Gummi-Metall-Technik GmbH, Buehl (DE); Trigum Engineering GmbH, Sevetal-Hitfeld (DE)

( * ) Notice: Subject to any disclaimer, the term of this patent is extended or adjusted under 35 U.S.C. 154(b) by 47 days.

(21) Appl. No.: 11/665,711

(22) PCT Filed: Oct. 19, 2005

(86) PCT No.: PCT/EP2005/011229
§ 371 (c)(1),
(2), (4) Date: Aug. 13, 2007

(87) PCT Pub. No.: WO2006/042750
PCT Pub. Date: Apr. 27, 2006

(65) Prior Publication Data
US 2008/0115622 A1  May 22, 2008

(30) Foreign Application Priority Data
Oct. 20, 2004  (DE) ...................... 20 2004 016 321 U

(51) Int. Cl.
*F16B 7/06*  (2006.01)
(52) U.S. Cl. ....................... 403/46; 403/359.5
(58) Field of Classification Search .............. 403/43–46, 403/359.5; 411/153
See application file for complete search history.

(56) References Cited

U.S. PATENT DOCUMENTS
346,771 A * 8/1886 Phillips ........................... 267/71
(Continued)

FOREIGN PATENT DOCUMENTS
DE  690671 C1  5/1940
DE  19 33 474 B1  1/1971
(Continued)

OTHER PUBLICATIONS

Decision on Revocation by EPO (Appeal Division) of Feb. 17, 2012 of EP 1805427 B1, in the name of GMT Gummi-Metall-Technik GmbH, Buhl, Germany and Trigum Engineering GmbH, Sevtal-Hitfeld, Germany because of an appeal filed on Sep. 8, 2010, by Ro-RA Production Gmbh, Schorfling am Attersee, Austria.

(Continued)

*Primary Examiner* — Joshua Kennedy
(74) *Attorney, Agent, or Firm* — Don J. Pelto, Esquire.; Sheppard, Mullin, Richter & Hampton LLP

(57) ABSTRACT

A threaded device is embodied in the form of an anti-twisting stop which is rotatably connected to a traction-pressure rod. Two oppositely located ratchet devices are connected by a body to stop the traction-pressure rod in several rotational positions with a predetermined locking force and, afterwards, to release it each time. The threaded device facilitates the mounting of the traction-pressure rod by the fact that the twisting should not be locked by additional handling, thereby making it possible to carry out a fine adjustment without additional measures. The ratchet device comprises, for example, two ratchet elements provided with one or several catch lugs or a metal or plastic ring part on one side and a gear rim on the other side. In addition, the threaded device can be provided with a spring element and a second anti-noise threaded device.

3 Claims, 4 Drawing Sheets

U.S. PATENT DOCUMENTS

| | | | | |
|---|---|---|---|---|
| 397,935 | A | * | 2/1889 | Powell .................. 411/314 |
| 781,067 | A | * | 1/1905 | Hewitt .................. 403/44 |
| 1,317,605 | A | * | 9/1919 | Thompson .................. 403/44 |
| 2,082,228 | A | * | 6/1937 | Stoll .................. 123/90.52 |
| 2,810,595 | A | | 10/1957 | Purdy |
| 2,845,288 | A | * | 7/1958 | Cierpik, Jr. .................. 403/46 |
| 3,501,828 | A | * | 3/1970 | Schultz .................. 29/896.7 |
| 3,989,394 | A | * | 11/1976 | Ellis .................. 403/46 |
| 4,046,481 | A | * | 9/1977 | Horvath .................. 403/320 |
| 4,069,902 | A | * | 1/1978 | Zdeb .................. 192/43 |
| 4,097,163 | A | * | 6/1978 | Dubuque .................. 403/274 |
| 4,580,665 | A | | 4/1986 | Saxton et al. |
| 4,829,845 | A | * | 5/1989 | Suzuki .................. 74/502.4 |
| 5,174,677 | A | | 12/1992 | Doolin et al. |
| 5,702,196 | A | | 12/1997 | Petercsak |
| 6,267,528 | B1 | * | 7/2001 | Higashino .................. 403/359.5 |
| 7,004,844 | B2 | * | 2/2006 | Fraher .................. 464/162 |
| 7,163,216 | B2 | * | 1/2007 | McLaughlin .................. 280/93.51 |

FOREIGN PATENT DOCUMENTS

| | | |
|---|---|---|
| DE | 1933474 B1 | 1/1971 |
| DE | 2635970 C3 | 3/1982 |
| DE | 197 04 053 A1 | 2/1998 |
| DE | 19704053 A1 | 2/1998 |
| DE | 20 2004 004407 U1 | 7/2004 |
| DE | 202004004407 U1 | 8/2004 |
| EP | 0 916 866 A | 5/1999 |
| EP | 1111285 A1 | 6/2001 |
| EP | 1209398 A2 | 5/2002 |
| JP | S58-94916 | 6/1983 |
| JP | H06-37202 | 9/1994 |

OTHER PUBLICATIONS

Statement of Jun. 14, 2012, by Applicant in Support of the remonstrance against the appeal decision by the Appeal Division of EPO of Feb. 17, 2012, relating to the revocation of EP 1805427B1.
English Translation of Main Claim at EPO.
English Translation of First Auxiliary Claim at EPO.
English Translation of Second Auxiliary Claim at EPO.
Notice of Appeal by Opponent at EPO.
English Translation of Reference E21 of Notice of Appeal by Opponent at EPO.
References E20 and E21.

* cited by examiner

PULL-PUSH ROD

CROSS REFERENCES TO RELATED APPLICATION

This application claims priority from German Application Priority Number 20 2004 016 321.7, priority date Oct. 20, 2004, and PCT Application number PCT/EP05/11229, filed Oct. 19, 2005, each of which is hereby incorporated herein by reference in the respective entirety of each.

FIELD OF THE INVENTION

The invention concerns a pull-push rod, in particular for guidance and mechanical support in machinery, aircraft and vehicle construction.

DESCRIPTION OF THE RELATED ART

Pull-push rods of this kind comprise in general an at least essentially tubular body at each end of which an adapter is located for the installation of the pull-push rod.

Pull-push rods of this kind are in general adjustable in their length in order that they can compensate for tolerances or adapt to a prescribed distance separating the installation points. In order to prevent inadvertent rotation of the pull-push rod in its installed state, an appropriate anti-rotation device in the form of locknuts or external locking mechanisms can finally be provided.

The installation of these pull-push rods requires a plurality of installation steps. In a first step the first adapter is firstly secured to a first installation point.

In the second step the adjustment or adaptation of the length of the pull-push rod in accordance with the distance separating the installation points is undertaken for the second adapter. For this purpose the person concerned in general requires both hands and/or a suitable tool.

In a third step the second adapter is then secured to a second installation point.

Subsequently in a fourth step the pull-push rod is secured against rotation. This step can in general also only be undertaken with both hands and/or with the use of appropriate tools or devices.

The execution of these installation steps can, in particular in confined spaces, be difficult and time-consuming.

BRIEF SUMMARY OF THE INVENTION

The object of the invention is therefore to create a pull-push rod that has an anti-rotation device and can also be installed easily and quickly in confined spaces.

In accordance with the invention this object is achieved by means of a pull-push rod with a body and at least one adapter for the installation of the pull-push rod, wherein the adapter for the alteration in length of the pull-push rod is connected with the body via a thread arrangement such that it can rotate; also by means of a latching device, which acts upon the rotational movement in such a manner that it can be releasably locked in a large number of rotational positions with a pre-determinable locking force.

A particular advantage of this solution consists in the fact that the above-cited fourth installation step is eliminated and the installation of the pull-push rod can therefore take place easily and speedily. Above all such push-pull rods, which make use of opposing, rotating thread arrangements for the two adapters, are easy to install. They are firstly secured with one of the two adapters to an installation point provided. Then the pull-push rod is adjusted to the required length by rotating the body. When this is achieved, the other adapter is also secured to the other installation point provided for this purpose. If necessary further subsequent fine adjustment of the length of the pull-push rod can take place by means of further rotation of the body. The latching device of the present invention ensures that after each rotation of the body re-locking of the pull-push rod is achieved without additional locking means being required for this purpose.

In particular the body takes the form of an essentially tubular body that can accommodate as necessary additional devices applicable to the functioning of the pull-push rod, such as for example, a safety device to prevent rotation out of engagement, and similar.

In accordance with a preferred embodiment of the invention the latching device has two latching elements, wherein a first latching element is arranged on the adapter and a second latching element is arranged on the body. In the first latching element a detent can be provided, with which it engages in the second latching element to lock the latching device. The second latching element can be designed for this purpose as a toothed ring, so that security against rotation is possible in a large number of rotational positions. Depending on how large the locking force should be, the first latching element can also have a plurality of detents, each of which engages in a corresponding position provided for this purpose in the second latching element.

The first latching element is securely connected with the adapter, at least in the direction of rotation.

In accordance with a further embodiment of the invention the first ratchet element has a partial ring, which surrounds the toothed ring in a sprung manner and exerts a force on the latter such that the body and the adapter can be locked together in the direction of rotation. Here the partial ring can consist of metal or plastic.

Finally the pull-push rod can have a spring element that presses a first thread against a second thread of the thread arrangement. The spring element preferably takes the form of a torsion spring, wherein the torsion spring is fitted coaxially with the axis of rotation of the body and around a shaft of the adapter. Such a spring element ensures good noise control. Since pull-push springs are subjected to a wide variety of loads in operation, the play in the threads can increase with time, as a result of which intrusive noise can be generated. Such noise is to be avoided, particularly in the case of vehicles such as aircraft, rail and motor vehicles.

BRIEF DESCRIPTION OF THE DRAWINGS

In what follows the invention is elucidated in more detail with the aid of a preferred example of embodiment. In the figures.

DETAILED DESCRIPTION OF EMBODIMENTS OF THE INVENTION

Figure 1:
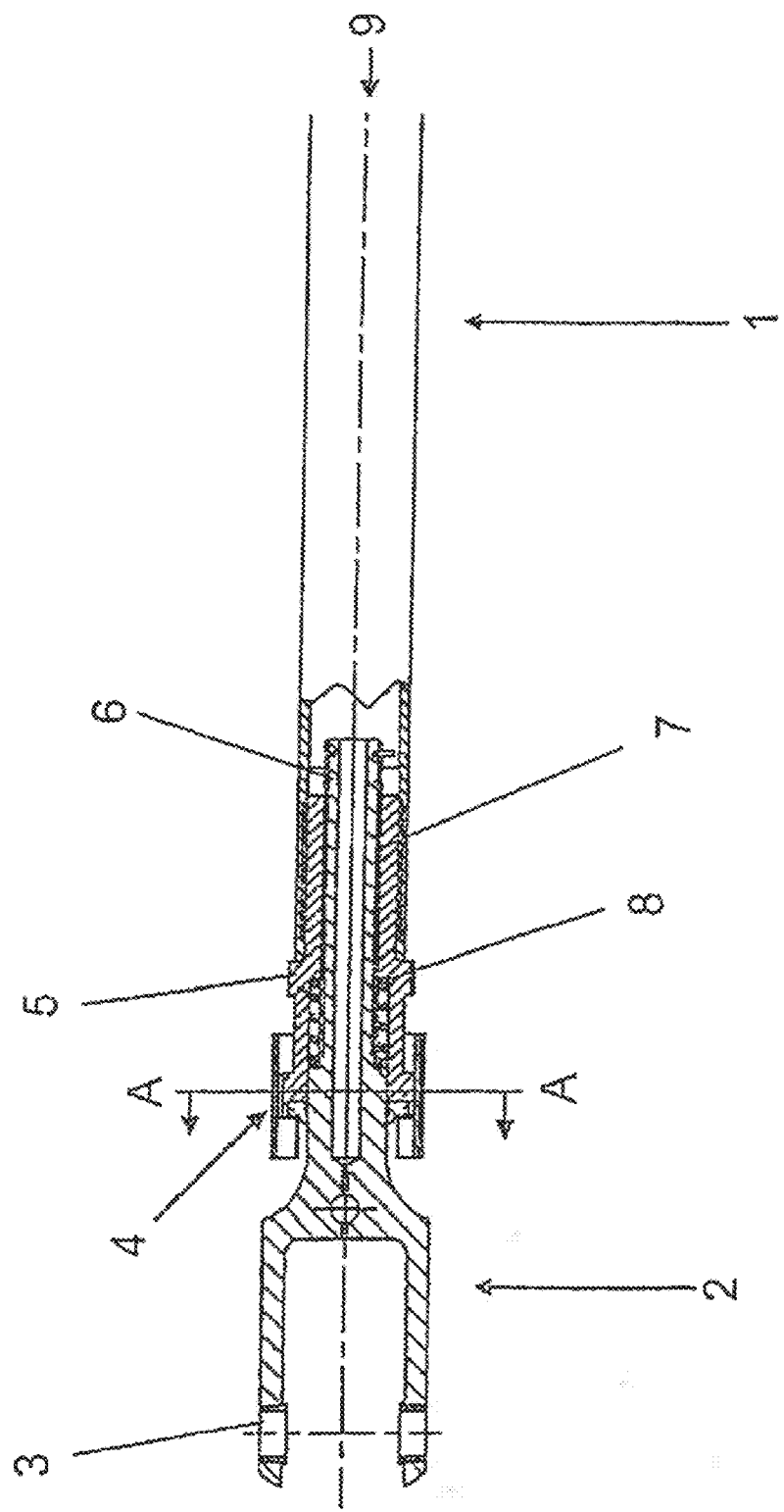
FIGS. 1 and 2 each show a pull-push rod, partly in cross-section.
Figure 2:
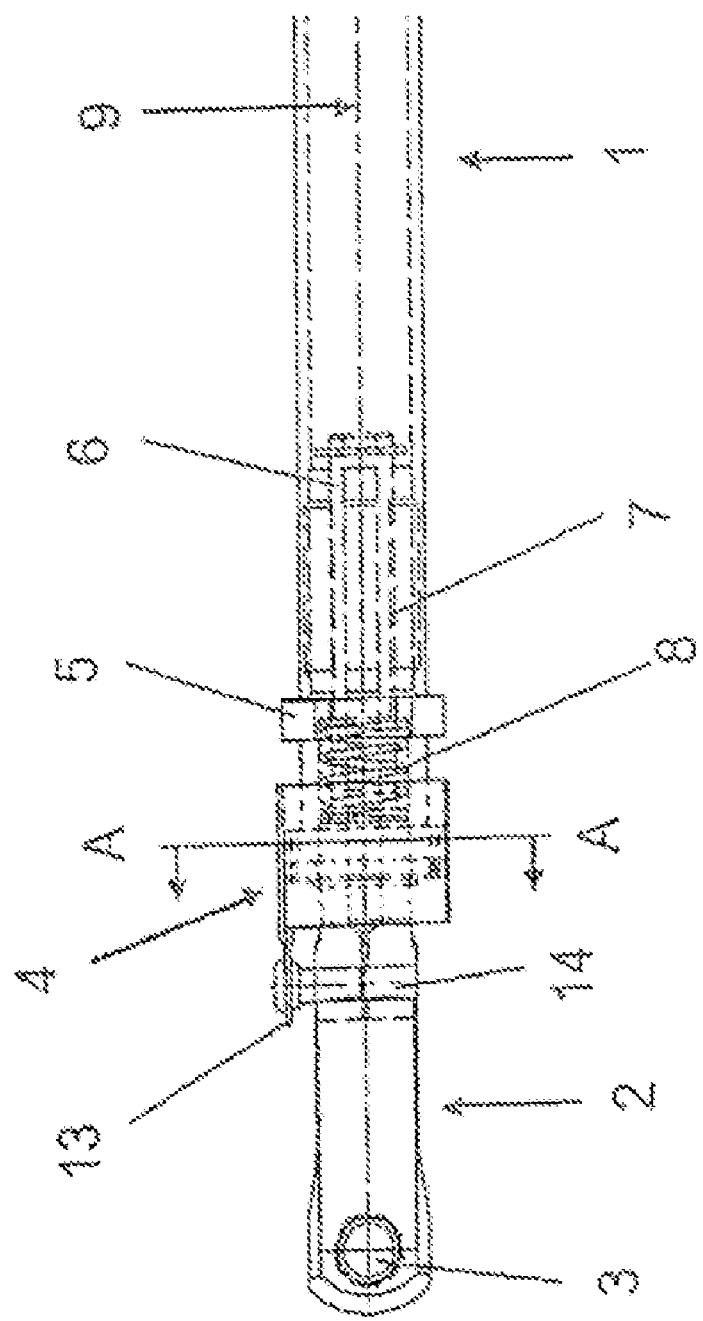

FIGS. 1 and 2 show one end of a tubular body 1, on which an adapter 2 is arranged, wherein in FIG. 2 the pull-push rod is represented rotated through 90° relative to FIG. 1. The body 1 and the adapter 2 are connected together via a thread arrangement 7. The thread arrangement 7 has a first thread on the inner wall of an insert element 5 connected with the body 1, and a second thread on the outer circumference of the shaft 6 of the adapter 2. The insert element 5 surrounds the shaft 6 and at the same time accommodates a spring element (torsion spring) 8. The spring element 8 presses the adapter 2 and the insert element 5 in opposing directions, as a result of which the threads of the thread arrangement 7 are pressed against each other. This has the advantage that noise generation in the pull-push rod is thus avoided. When the pull-push rod is under load, forces act along the axis of rotation 9, as a result of which the play in the thread arrangement 7 increases in the course of time.

A bored hole 3 in the forked section of the adapter 2 serves for installation of the pull-push rod. The adapter 2 is securely connected with the latching device 4 by means of a pin 14 and a connecting element 13.

Figure 3:
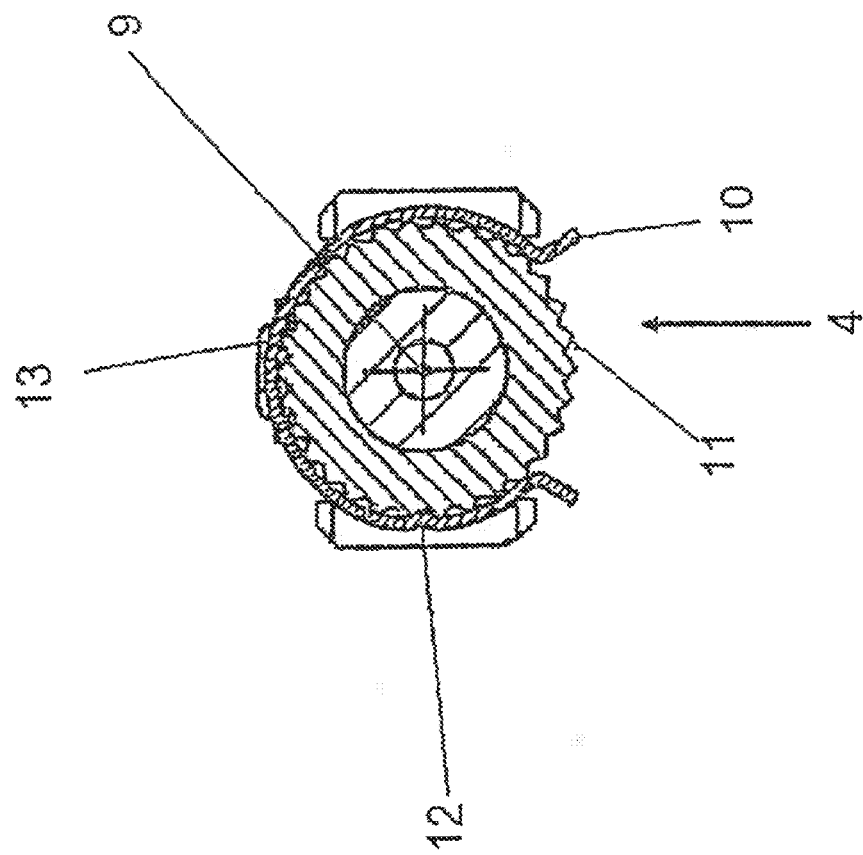
FIG. 3 shows a cross-section through a latching device.

FIG. 3 shows a cross-section through the latching device 4 along the line A-A. Here the first latching element 10 secured to the adapter 2 is represented as a spring ring, which encompasses a second latching element 11 secured to the body 1. The spring ring has at least one detent 12, with which it engages in the second latching element 11 to lock the latching device 4. The second latching element 11 is designed as a toothed ring, so that security against rotation is possible in a large number of rotational positions of the body. As long as the body 1 is not being rotated, the detent 12 of the spring ring presses into a tooth space of the toothed ring. The latching device 4 is then locked. If the body 1 is rotated around the axis of rotation 9, the spring ring opens out so that rotation of the body 1 relative to the adapter 2 is possible, until a new locking action takes place.

Figure 4:
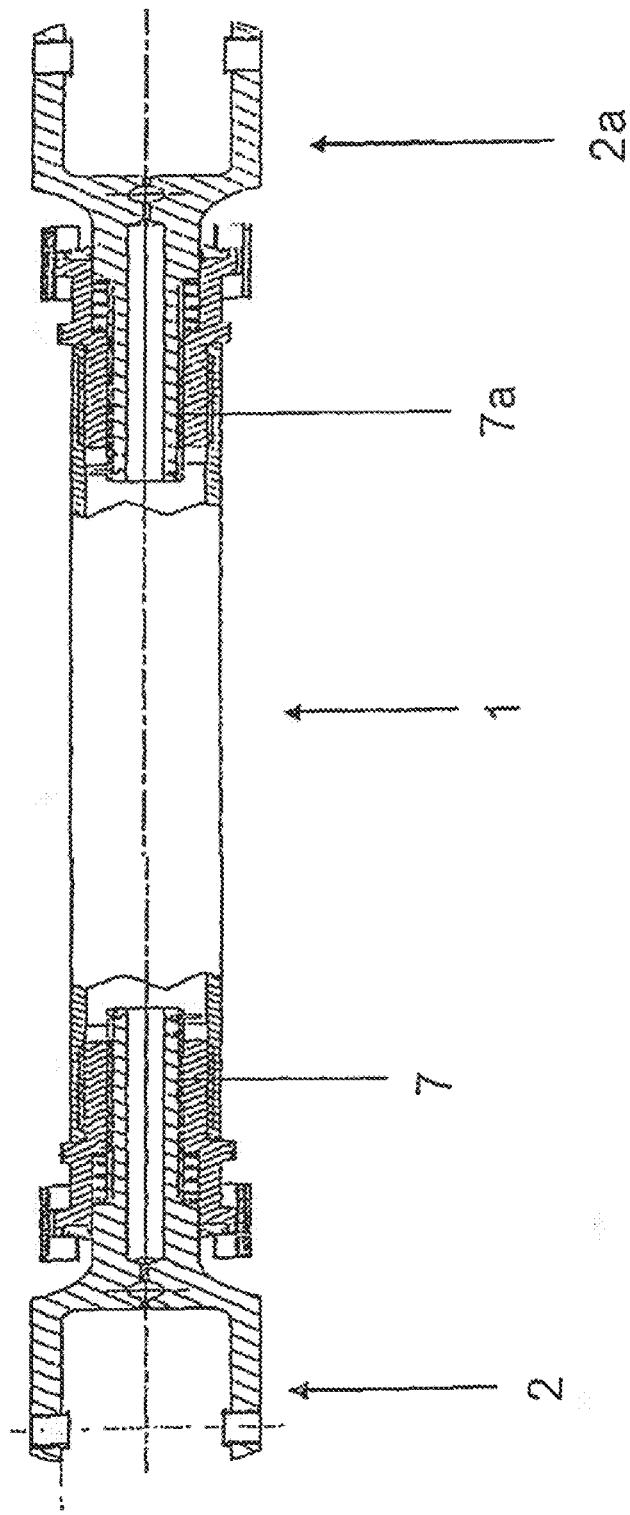
FIG. 4 shows a pull-push rod with two adapters.

In general two adapters 2, 2a are fitted at the opposing ends of the body 1, as is represented in FIG. 4. The thread arrangements 7, 7a are also represented. The installation of a pull-push rod of this kind takes place in the following manner:

In the first step the first adapter 2 is secured to a surrounding structure, and in a second step the adjustment or adaptation of the length of the pull-push rod is undertaken according to the distance separating the installation points. This is achieved by rotating the body 1. In a third step the second adapter 2a is then connected with the corresponding installation points. The pull-push rod is thus quickly and easily installed without the need for additional locking procedures.

REFERENCE SYMBOL LIST 1 body
2, 2a adapter
3 bored hole
4 latching device
5 insert element
6 shaft
7, 7a thread arrangement
8 spring element
9 axis of rotation
10 first latching element
11 second latching element
12 detent
13 connecting element
14 bolt

The invention claimed is:

1. A draw-pull bar comprising:
a body and at least one adapter to be fitted to the draw-pull bar;
wherein the adapter is connected to the body by means of a threaded arrangement and provides for a length variation of the draw-pull bar;
wherein the adapter can be turned relative to the body and can be turned relative to a toothed rim of a detent mechanism comprising:
a locking element connected to the adapter by means of a pin and a connecting element, and
the toothed rim attached to the body;
wherein the pin and connecting element load rotary movement of the adapter such that the adapter can be locked in a plurality of rotary positions and unlocked from the plurality of rotary positions under application of a predeterminable locking force,
wherein the locking element comprises a partial ring with a single locking nose,
wherein the locking nose locks into a tooth space of the toothed rim for arresting the detent mechanism,
wherein the partial ring at least partially surrounds the toothed rim with a suitable spring force such that the body and the adapter are connected in a lockable and releasable turning direction, and
wherein the partial ring sufficiently surrounds the toothed rim such that the spring force presses the nose into the tooth space of the toothed rim.

2. The draw-pull bar as set forth in claim 1,
wherein a torsion suspension element is attached coaxially to the rotational axis of the body and to a shaft of the adapter,
wherein the torsion suspension element presses a first thread to a second thread of the threaded arrangement;
wherein a first end of the body comprises the first adapter;
wherein a second end of the body comprises a second adapter, the first and second adapter configured to fit the draw-pull bar between two mounting points; and
wherein the first and second adapters are connected to the body by opposing threaded arrangements such that, by turning the body relative to the adapters, the length of the draw-pull bar can be varied smoothly and can be arrested.

3. The draw-pull bar as set forth in claim 1, wherein the partial ring at least two thirds surrounds the toothed rim.

* * * * *